May 8, 1951  J. C. HAUN  2,552,375
PLUG VALVE

Filed Jan. 10, 1947  2 Sheets-Sheet 1

INVENTOR.
Joyc C. Haun, Deceased
By Florence Patricia Mills, Executrix
By Albert G. M<sup>c</sup>Caleb
Attorney May 8, 1951  J. C. HAUN  2,552,375
PLUG VALVE
Filed Jan. 10, 1947  2 Sheets-Sheet 2
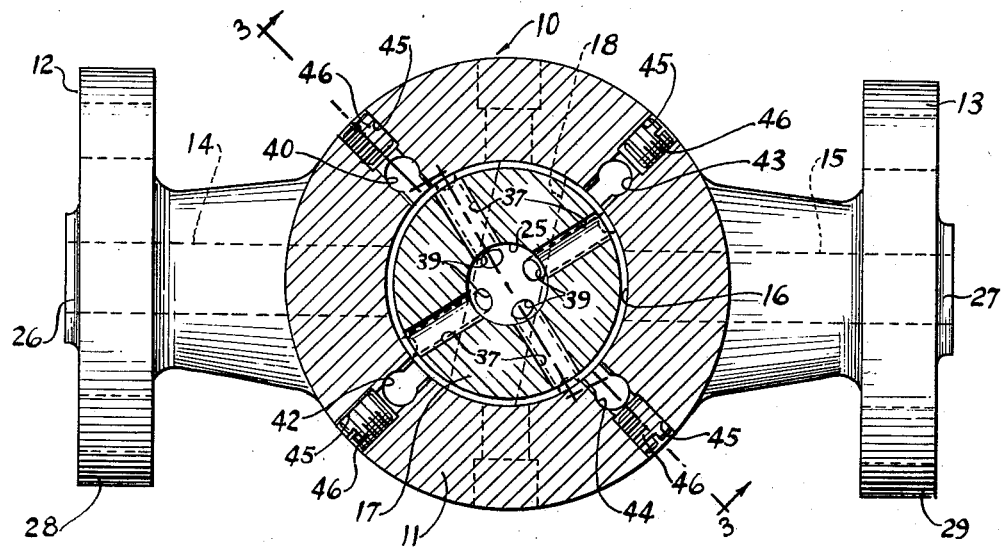
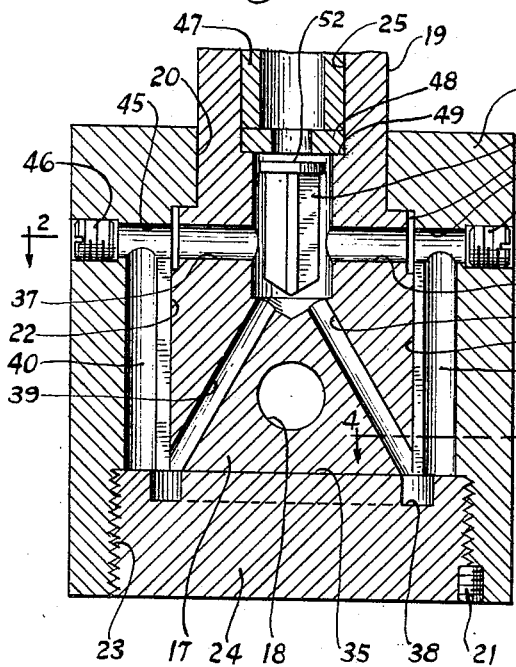
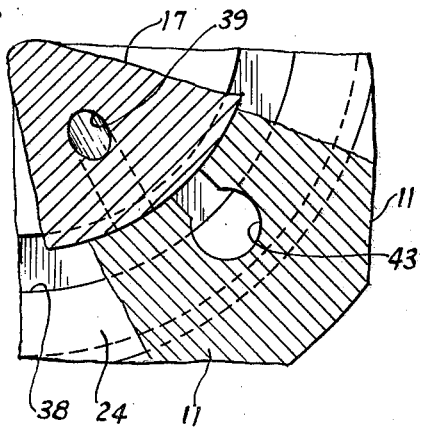
INVENTOR.
Joye C. Haun, Deceased
By Florence Patricia Mills, Executrix
By Albert G. McCaleb
Attorney Patented May 8, 1951

2,552,375

UNITED STATES PATENT OFFICE 2,552,375

PLUG VALVE

Joye C. Haun, deceased, late of San Francisco, Calif., by Florence Patricia Mills, executrix, Wallowa, Oreg., assignor to Florence Patricia Mills, Wallowa, Oreg.

Application January 10, 1947, Serial No. 721,347

3 Claims. (Cl. 251—103)

This invention relates to plug valves, and more particularly to such valves of a type incorporating a cylindrical plug and wherein the sealing of the valve is accomplished through the use of a sealing medium, such as a plastic material containing finely divided metallic particles.

It is one of the objects of the present invention to provide a plug valve of the character described wherein a system of passages and grooves is so constructed and arranged that substantially equal packing pressures are provided in all parts of the grooves.

The invention further comprehends the provision of a plug valve wherein consistent character of the packing material is maintained throughout the various parts of the valve.

As another object, this invention provides for application of packing pressure to the packing material from both ends of the grooves.

A further object of the invention is to provide a plug valve wherein packing material is supplied to a system of passages and grooves in such a way that the tendency is to extrude contaminated or dirty packing material out of the grooves rather than allowing it to accumulate in any part of the valve.

Other objects and advantages of the invention will be apparent from the following description and the accompanying drawings in which similar characters of reference indicate similar parts throughout the several views.

In the two sheets of drawings:

Fig. 2 is a plan view partially in section of the valve shown in Fig. 1 and wherein the section is taken substantially on a line 2—2 of Fig. 3;

Figure 1:
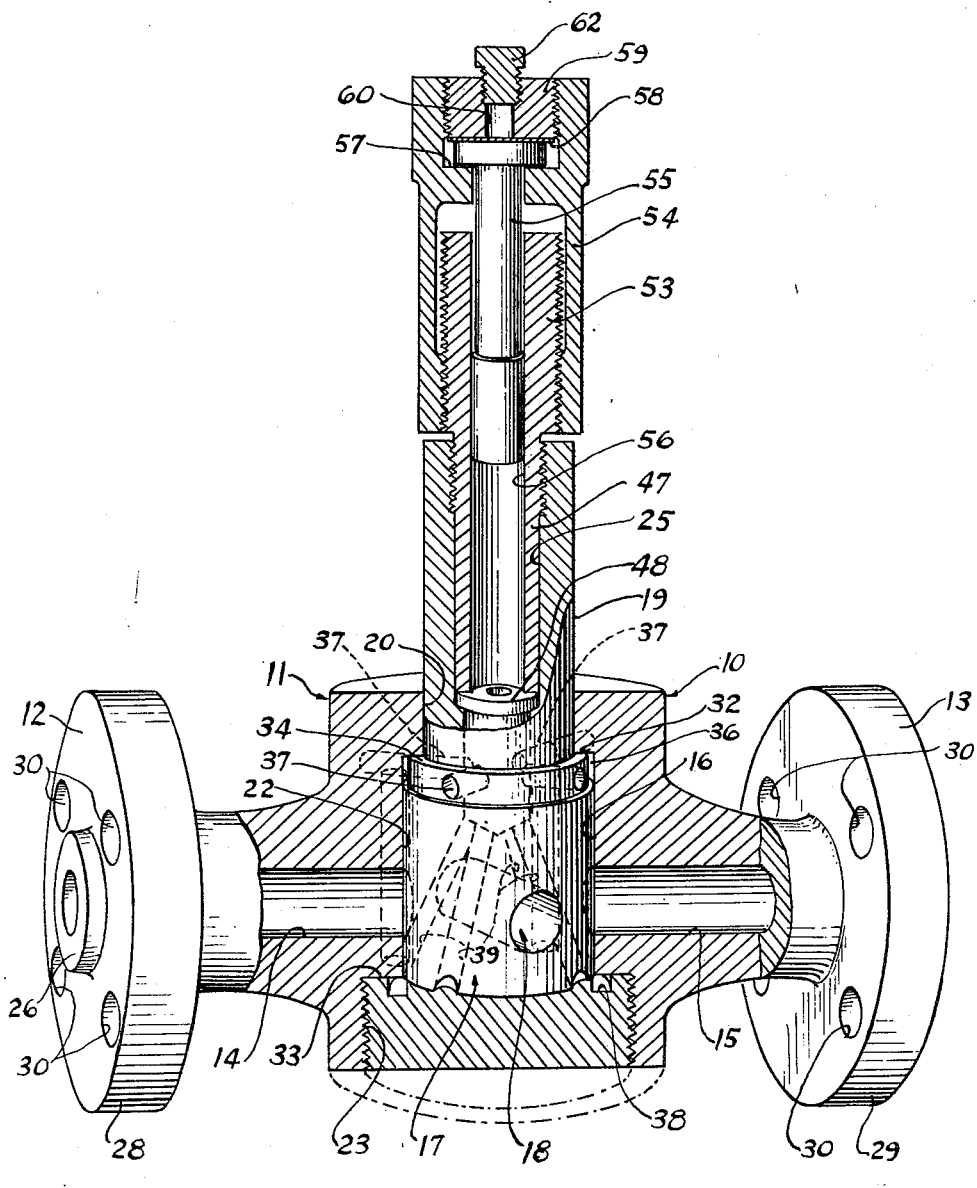
Fig. 1 is a side perspective view with parts cut away and shown in section to indicate details of internal structure of a plug valve embodying a preferred form of the present invention.

Fig. 3 is a fragmentary sectional view of the valve shown in Figs. 1 and 2 wherein the section is taken substantially on a line 3—3 of Fig. 2; and Fig. 4 is a fragmentary sectional view with the section taken substantially on a line 4—4 of Fig. 3.

The plug valve which is shown in the accompanying drawings for illustrative purposes is indicated generally by the reference numeral 10. In its broader aspects, the valve 10 has a body 11 provided at opposite ends with flange type connecting portions 12 and 13. Opposed ports 14 and 15 serve as inlet and outlet openings for the valve and communicate with a cylindrical internal opening which is designated generally by the reference numeral 16, and the axis of which cylindrical opening is transverse to the aligned axes of the ports 14 and 15. A cylindrical valve plug 17 is mounted for rotation within the cylindrical opening 16 and is provided with a lateral through bore 18 disposed at a position for providing communication between the ports 14 and 15 in the housing when the plug is turned to a position of alignment with those housing ports. When turned to a position transverse to the housing ports, the inner ends of the ports are closed.

At one end and coaxially disposed therewith, the cylindrical valve plug 17 has integrally formed thereon a cylindrical stem 19 which fits snugly in and extends through a bore 20 in the mid-portion of the valve body 11. By preference, the opening 16 in the valve body includes the bore 20 and two successively larger coaxial counterbores 22 and 23; the counterbore 22 serving as a seat for the cylindrical valve plug and the counterbore 23 being threaded to receive a closure plug 24. After being seated in position, the closure plug may be secured in such position by retaining means such as a set screw 21 threaded into an opening which is partially in the plug 24 and partially in the body 11, as shown in Fig. 3.

As will be more fully explained, the stem 19 has therein an axial bore 25 which extends into the adjacent end portion of the valve plug 17 and, together with other parts of the valve, serves as a chamber for holding a supply of sealing compound utilized to form an effective seal between the valve parts during their use. The sealing compound referred to is one of those known and used for such valves and may be, for example, finely divided lead particles carried by a plastic medium.

Considered in greater detail, the flange type connecting portions 12 and 13 of the valve housing have seating surfaces 26 and 27 adjacent the outer ends of the ports 14 and 15 and from which fastening flanges 28 and 29 project radially. The fastening flanges have a plurality of spaced openings 30 therein for the accommodation of fastening elements, such as bolts, for securing the valve to adjoining fittings.

With the type of valve structure disclosed herein, the valve plug 17 and the surface of the counterbore 22 need not be ground to provide a tight and relatively perfect fit in order to prevent leakage of the valve, even when such valve is to be used for controlling the flow of fluid under high pressure. As a matter of fact, those parts need only have an ordinary machine finish and a reasonably accurate fit. The valve structure and arrangement are such that a sealing compound of the type referred to furnishes the necessary seal between the parts to prevent the leakage of fluid therefrom when the valve is either open or closed.

In the structure disclosed, the bore 20 is separated from the counterbore 22 by a radial shoulder 32 and the counterbore 22 is separated from the counterbore 23 by a second radial shoulder 33. Also, the valve plug has a radial shoulder 34 at one end adjacent the stem 19. In the assembly of the valve the stem 19 is placed in the bore 20 and the shoulders 32 and 34 abut axially to locate the valve plug within the body. The closure plug 24 has a plane inner end surface 35, against which the end of the valve plug opposite the shoulder 34 seats in the assembly.

At the end adjacent the stem 19 and shoulder 34, the valve plug is radially cut away for a portion of its length to provide an annular passage 36 defined in association with the counterbore 22 and shoulder 32 at the stem end of the valve plug. A plurality of radial passages 37 in the upper end of the valve plug provide communication between the axial bore 25 and the annular passage 36. In my preferred valve structure the passages 37 are oppositely disposed and spaced so that their outer ends are on opposite sides of the ports 14 and 15 in either the open or closed positions of the valve.

In its inner end surface, the closure plug 24 is provided with an annular channel 38 which underlies a portion of the shoulder 33 and an outer marginal portion of the end of the valve plug 17. Continuous communication, regardless of the position of the valve plug, is provided between the bore 25 and the annular channel 38 by a plurality of diagonally disposed passages 39 in the valve plug. The outer ends of the passages 39 are preferably spaced in substantial conformity to the spacing of the outer ends of the passages 37.

Along opposite sides of the counterbore 22 and disposed in spaced relationship to the inner ends of the inlet and outlet ports 14 and 15 are longitudinally extending grooves 40, 42, 43 and 44. These grooves are desirably of substantially keyhole shape in section and open radially into the counterbore 22. Each of the grooves communicates at one end with the annular channel 38 and at its other end overlaps a marginal portion of the annular passage 36, as well as having additional communication with the annular passage 36 through a radial bore 45. The radial bores 45 are drilled from the outside of the valve body and have their outer ends closed by plugs 46 to facilitate the manufacture of the valve body.

From the foregoing description of the various passages, grooves and channel and their connections, it may be readily understood that sealing compound from the bore 25 is forced directly through the annular passage 36 and the channel 38 through the passages 37 and 39, respectively. Such sealing compound not only flows around the annular passage 36 and the end channel 38 to form end seals between the valve plug and body, but also flows into the grooves 40, 42, 43 and 44 from opposite ends at the same time from the annular passage 36 and the channel 38, regardless of the position of the plug.

As depicted in Fig. 1, the disclosed plug has parts incorporated in the stem structure for manually forcing the sealing compound into the passages, grooves and channel from a supply chamber and when desired. For this purpose a tubular stem insert 47 is threaded into the bore 25 and extends to a position, as indicated in Figs. 1 and 3, such that its end retains a valve seat washer 48 against a shoulder 49 near the inner end of the bore. Below the valve seat washer 48 and within the bore 25 is a floating check valve element 50 having an end seating surface 52 adapted to seat against the washer 48 so as to permit the flow of sealing compound into the end portion of the bore 25 and the passages 37 and 39 while preventing the movement of the sealing compound in the reverse direction.

As depicted in Fig. 1, the tubular stem insert 47 extends beyond the end of the stem 19 and has an enlarged end portion 53 threaded on its exterior surface. A cap 54 is threaded onto the enlarged end portion 53 of the stem insert and carries a plunger 55 which fits snugly in and extends into an interior bore 56 in the tubular insert 47. Movement of the plunger into the bore 56 forces the sealing compound therefrom and into the connected passages and channel of the valve through the check valve.

In order to prevent binding of the plunger 55 within the bore 56 as the cap 54 is turned, it is desirably held in position by a floating connection which allows some play during the turning movement of the cap and the axial movement of the plunger. Thus, the plunger has a flanged end which is engaged between a shoulder 57 in the end portion of the cap and a washer 58 held in place within the end portion of the cap by a plug 59. By preference, the plug 59 has a central opening 60 therein which is closed by means such as a threaded plug 62.

In the operation of the disclosed valve, the valve plug is turned relative to the valve body by turning the stem 19. It is usually considered desirable to apply pressure to the sealing compound when the valve is in either its open or closed position so as to provide a complete seal within the valve around the ports 14 and 15. Such pressure may be relieved during the turning of the valve from one position to another, although such relief of the pressure is not necessary.

By introducing the sealing compound directly into the annular passage 36 and the annular channel 38 so that it flows therefrom into both ends of the longitudinal grooves which complete the framing of the ports, uniform and consistent character of the packing is maintained throughout the valve. The disclosed system of passages further requires less initial compressive force on the packing to obtain equal packing pressures in all grooves than is necessary when the grooves and passages are fed from one end only. By feeding the longitudinal grooves from both ends, the packing material which replaces that sheared off and lost during movement of the valve plug, moves inwardly toward the ports from both ends of the grooves and thus prevents the accumulation of contaminated packing material within any of the grooves or passages, and particularly within the channel 38 at the end of the plug.

While a preferred embodiment of this invention has been illustrated, many modifications may be made without departing from the spirit of the invention, and it is not intended that the invention is to be limited to the precise details of the construction set forth, but shall include all of the changes within the scope of the appended claims.

Having thus described the present invention, what is claimed as new and desired to be secured by Letters Patent of the United States is:

1. A plug valve comprising, in combination, a valve body having a cylindrical bore through the mid-portion thereof with two counterbored portions, the first of which counterbores provides a plug seat and has inlet and outlet ports communicating with opposite sides thereof, said bore and counterbores being separated by radial shoulders, a cylindrical valve plug mounted for rotation in said first counterbore and having a stem projecting from said cylindrical bore, said valve plug having a shoulder engaging one of said radial shoulders and being grooved adjacent said radial shoulder to provide an annular passage for sealing compound, said valve plug also having a through bore disposed for alignment with the inlet and outlet ports when the plug is turned to a proper position, said stem having a chamber for sealing compound therein which extends into the valve plug, said valve plug having a plurality of oppositely disposed passages therein connecting said chamber to the annular passage, an end plug secured in the second of said counterbores to provide a fluid-tight closure for the body and a seat for the end of the valve plug, said end plug having an annular channel in its inner end surface partially underlying the edge of the end surface of the plug and opening into the first counterbore, said valve plug having a plurality of passages therein providing communication for the flow of sealing compound from said chamber to said annular channel, said housing having grooves therein extending longitudinally of, and opening radially into said first counterbore on opposite sides of said inlet and outlet ports, said grooves communicating at their ends with said annular passage and said annular channel, and means for applying pressure sealing compound in said chamber to force the compound into said grooves through the annular passage and the channel.

2. A plug valve comprising, in combination, a valve body having a cylindrical bore through the mid-portion thereof with two counterbored portions, the first of which counterbores provides a plug seat and has inlet and outlet ports communicating therewith, said bore and counterbores being separated by shoulders, a cylindrical valve plug mounted for rotation in said first counterbore and having a stem projecting from said cylindrical bore, said valve plug having a shoulder engaging one of said shoulders in the body and being grooved adjacent said shoulder in the body to provide an annular passage for sealing compound, said valve plug also having a through bore disposed for alignment with the inlet and outlet ports when the plug is turned to a predetermined position, said stem having a chamber for sealing compound therein, said valve plug having a plurality of passages therein connecting said chamber to the annular passage, an end plug secured in the second of said counterbores to provide a fluid-tight closure for the body and a seat for the end of the valve plug, said end plug having an annular channel in its inner end surface partially opening into the first counterbore, said valve plug having a plurality of passages therein providing communication for the flow of sealing compound from said chamber to said annular channel, said housing having grooves therein extending longitudinally of, and opening radially into said first counterbore on opposite sides of said inlet and outlet ports, said grooves communicating at their ends with said annular passage and said annular channel, and means for applying pressure to sealing compound in said chamber to force the compound into said grooves through the annular passage and the channel.

3. A plug valve comprising, in combination, a valve body having a cylindrical bore through the mid-portion thereof with a counterbored portion which provides a plug seat and has inlet and outlet ports communicating therewith, said bore and counterbore being separated by a radial shoulder, a cylindrical valve plug mounted for rotation in said counterbore and having a stem projecting from one end thereof, said valve plug having a shoulder engaging said radial shoulder and being grooved adjacent said radial shoulder to provide an annular passage for sealing compound, said valve plug also having a through bore disposed for alignment with the inlet and outlet ports when the plug is turned to a predetermined position, said stem having a chamber for sealing compound therein which extends into the valve plug, said valve plug having a plurality of oppositely disposed passages therein connecting said chamber to the annular passage, means providing a closure for the end of said cylindrical bore opposite said radial shoulder, the last mentioned means having an annular channel in its inner end surface partially underlying the edge of the end surface of the valve plug and opening into the counterbore, said valve plug having a plurality of passages therein providing communication for the flow of sealing compound from said chamber to said annular channel, said housing having grooves therein extending axially along the side wall of said counterbore on opposite sides of said inlet and outlet ports, said grooves communicating at their ends with said annular passage and said annular channel, and means for applying pressure to sealing compound in said chamber to force the compound into said grooves through the annular passage and the channel.

FLORENCE PATRICIA MILLS,
*Executrix of the Last Will and Testament of Joye C. Haun, Deceased.*

REFERENCES CITED

The following references are of record in the file of this patent:

UNITED STATES PATENTS

| Number | Name | Date |
| --- | --- | --- |
| 2,058,747 | Wilkins | Oct. 27, 1936 |
| 2,058,748 | Wilkins | Oct. 27, 1936 |
| 2,250,124 | Carter | July 22, 1941 |
| 2,388,827 | Carter | Nov. 13, 1945 |
| 2,389,670 | Kerr | Nov. 27, 1945 |